(12) United States Patent
Ueda

(10) Patent No.: US 12,203,597 B2
(45) Date of Patent: Jan. 21, 2025

(54) TANK AND MANUFACTURING METHOD FOR TANK

(71) Applicant: TOYOTA JIDOSHA KABUSHIKI KAISHA, Toyota (JP)

(72) Inventor: Naoki Ueda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/166,127

(22) Filed: Feb. 8, 2023

(65) Prior Publication Data

US 2023/0332743 A1 Oct. 19, 2023

(30) Foreign Application Priority Data

Apr. 19, 2022 (JP) .................. 2022-068674

(51) Int. Cl.
*F17C 1/08* (2006.01)
*B29C 35/02* (2006.01)
(Continued)

(52) U.S. Cl.
CPC ................ *F17C 1/08* (2013.01); *B29C 35/02* (2013.01); *B29C 63/34* (2013.01); *B29C 70/32* (2013.01);
(Continued)

(58) Field of Classification Search
CPC ................ F17C 1/08; F17C 2201/0109; F17C 2203/012; F17C 2203/0604; F17C 2203/0621; F17C 2203/0673; F17C 2209/2163; F17C 2209/232; F17C 2221/012; F17C 2221/033; F17C 2270/0184; F17C 1/06; F17C 2203/067; F17C 2209/219; F17C 2223/0123; F17C 2223/0161; F17C 1/16; F17C 2203/011;
(Continued)

(56) References Cited

U.S. PATENT DOCUMENTS

| | | | |
|---|---|---|---|
| 2016/0089820 A1 | 3/2016 | Schinkinger | |
| 2016/0354970 A1* | 12/2016 | Taki | B29C 70/32 |
| 2021/0339491 A1* | 11/2021 | Ueda | B29C 70/32 |

FOREIGN PATENT DOCUMENTS

| | | |
|---|---|---|
| AT | 514342 A1 | 12/2014 |
| DE | 102016105856 A1 | 12/2016 |

(Continued)

*Primary Examiner* — Daniel H Lee
(74) *Attorney, Agent, or Firm* — Hunton Andrews Kurth LLP

(57) ABSTRACT

A manufacturing method for a tank including a liner and a reinforcement layer having a first layer made up of a pipe fitted to an outer surface of the liner and a second layer covering the pipe includes forming the pipe by winding first fiber reinforced resin containing a first fiber and a first resin around a mandrel and thermally curing the first fiber reinforced resin under a first condition, forming the first layer by fitting the pipe to the liner, and forming the second layer by winding a second fiber reinforced resin containing a second fiber and a second resin around the liner to cover the first layer and thermally curing the second fiber reinforced resin under a second condition. The second condition defines an upper limit temperature at which a shear strength of the first resin is kept higher than a residual stress in the pipe.

3 Claims, 4 Drawing Sheets

(51) Int. Cl.
    *B29C 63/34*    (2006.01)
    *B29C 70/32*    (2006.01)
    *B29L 9/00*     (2006.01)

(52) U.S. Cl.
    CPC ... *B29L 2009/00* (2013.01); *F17C 2201/0109* (2013.01); *F17C 2203/012* (2013.01); *F17C 2203/0604* (2013.01); *F17C 2203/0621* (2013.01); *F17C 2203/0673* (2013.01); *F17C 2209/2163* (2013.01); *F17C 2209/232* (2013.01); *F17C 2221/012* (2013.01); *F17C 2221/033* (2013.01); *F17C 2270/0184* (2013.01)

(58) Field of Classification Search
    CPC ......... B29C 35/02; B29C 63/34; B29C 70/32; B29C 70/54; B29L 2009/00; B29L 2031/7156; B65D 90/029; B65D 90/06; B29K 2105/0872; B29D 22/003
    See application file for complete search history.

(56) References Cited

FOREIGN PATENT DOCUMENTS

| | | | |
|---|---|---|---|
| JP | 2016223569 | A | 12/2016 |
| JP | 2020118288 | A | 8/2020 |

* cited by examiner

TANK AND MANUFACTURING METHOD FOR TANK

CROSS-REFERENCE TO RELATED APPLICATION

This application claims priority to Japanese Patent Application No. 2022-068674 filed on Apr. 19, 2022, incorporated herein by reference in its entirety.

BACKGROUND

1. Technical Field

The disclosure relates to a tank and a manufacturing method for a tank.

2. Description of Related Art

As a manufacturing method for a tank including a reinforcement layer made of fiber reinforced resin impregnated with thermosetting resin and disposed on the outer periphery of a liner, there is known a manufacturing method including a process of forming a pipe from a prepreg in advance and fitting the pipe to a liner. For example, Japanese Unexamined Patent Application Publication No. 2016-223569 (JP 2016-223569 A) describes a manufacturing method for a tank. In the manufacturing method, a pipe (cylindrical sheet layer) is fitted to a liner, then fiber reinforced resin is helically wound around the liner to which the pipe is fitted, and the helically wound fiber reinforced resin is heated. Thus, a helical layer is formed. The pipe is formed by, for example, heating fiber reinforced resin wound around a mandrel different from the liner and thermally curing the fiber reinforced resin, as described in JP 2016-223569 A.

SUMMARY

When heating is performed after helical winding, heat is applied to the fiber reinforced resin forming the helical layer, and heat is also applied to the pipe again. At this time, the resin contained in the pipe softens again due to heat, and the strength of the pipe decreases. As a result, residual stress in the pipe may exceed the strength of the pipe to break part of the pipe.

The disclosure may be implemented as the following aspects.

(1) An aspect of the disclosure provides a manufacturing method for a tank including a liner and a reinforcement layer. The reinforcement layer has a first layer and a second layer. The first layer is made up of a pipe fitted to an outer surface of the liner. The second layer covers the pipe. The manufacturing method includes forming the pipe by winding a first fiber reinforced resin containing a first fiber and a first resin around a mandrel and thermally curing the first fiber reinforced resin wound around the mandrel under a first heating condition, forming the first layer by fitting the pipe to the liner, and forming the second layer by winding a second fiber reinforced resin containing a second fiber and a second resin around the liner so as to cover the first layer and thermally curing the second fiber reinforced resin wound around the liner under a second heating condition. The second heating condition includes a condition in which a temperature at which a shear strength of the first resin contained in the first layer is kept higher than a residual stress in the pipe is an upper limit temperature. With the manufacturing method according to this aspect, when the second layer is formed by thermal curing, the shear strength of the first resin contained in the first layer is kept higher than the residual stress in the pipe. Therefore, when the second layer is formed, breakage of the pipe due to heating is suppressed.

(2) The manufacturing method according to the above aspect may further include preparing a mandrel made of a material having the same coefficient of linear expansion as the first fiber reinforced resin as the mandrel. With the manufacturing method according to this aspect, since the pipe and the mandrel have the same coefficient of linear expansion, the pipe and the mandrel thermally expand at the same rate when the pipe is formed. Therefore, in comparison with the case where a pipe is formed by using a mandrel having a coefficient of linear expansion different from the coefficient of linear expansion of the pipe, the residual stress in the pipe formed reduces. Therefore, when the second layer is formed, breakage of the pipe due to heating is suppressed.

(3) In the manufacturing method according to the above aspect, the second heating condition may include a condition in which the second fiber reinforced resin wound around the liner is heated at a setting temperature of the second resin, and the manufacturing method may further include preparing the first resin and the second resin such that, at the setting temperature of the second resin, the shear strength of the first resin contained in the first layer is higher than a residual stress in the pipe. With the manufacturing method according to this aspect, the shear strength of the first resin is kept higher than the residual stress in the pipe at the setting temperature of the second resin. Therefore, when the second layer is formed, breakage of the pipe due to heating is suppressed.

(4) In the manufacturing method according to the above aspect, a maximum heating temperature under the second heating condition may be lower than a maximum heating temperature under the first heating condition. With the manufacturing method according to this aspect, when the second layer is formed by thermal curing, a maximum temperature to be applied to the pipe is lower than the maximum temperature applied when the pipe is formed not only when the heating temperature is constant but also when the heating temperature changes with time. Therefore, when the second layer is formed, a decrease in the shear strength of the first resin is suppressed, and breakage of the pipe due to heating is suppressed.

(5) Another aspect of the disclosure provides a tank. The tank includes a liner and a reinforcement layer. The reinforcement layer has a first layer and a second layer. The first layer is made up of a pipe fitted to an outer surface of the liner. The second layer covers the pipe. A setting temperature of a first resin contained in the first layer is higher than a setting temperature of a second resin contained in the second layer. With the tank according to this aspect, since the setting temperature of the first resin is higher than the setting temperature of the second resin, when the second layer is formed by thermal curing, it is possible to reduce a situation in which the shear strength of the first resin is lower than the residual stress in the pipe in comparison with the case where the setting temperature of the first resin is lower than the setting temperature of the second resin. Therefore, when the second layer is formed, breakage of the pipe due to heating is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

A1. Device Configuration

Figure 1:
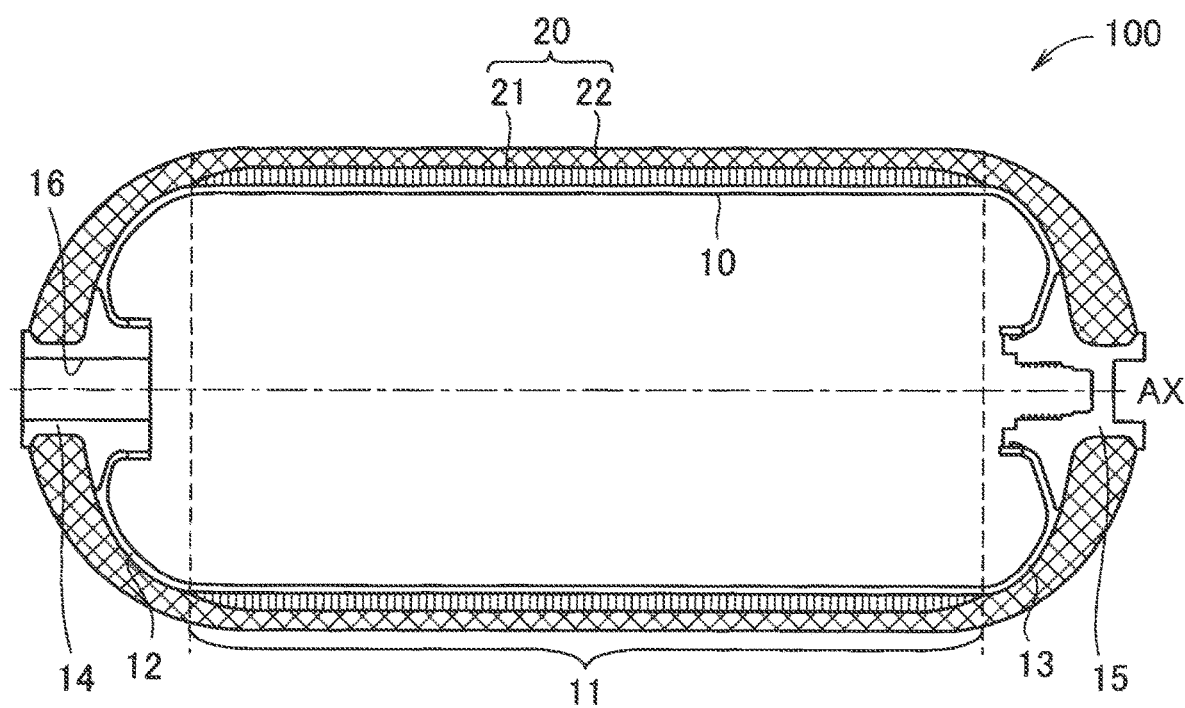
FIG. 1 is a sectional view that shows the configuration of a tank according to a first embodiment of the disclosure.

FIG. 1 is a sectional view that shows the configuration of a tank 100 according to a first embodiment of the disclosure. The tank 100 is a container that stores fluid. The fluid is, for example, gas, such as hydrogen gas, or liquid, such as liquefied natural gas (LNG). The tank 100 is used in, for example, a fuel cell mounted on a fuel cell electric vehicle (FCEV) or other cells. The tank 100 includes a liner 10 and a reinforcement layer 20.

The liner 10 is a hollow container. The liner 10 is made of a resin or a metal. Examples of the resin include gas-barrier resins, such as nylon, polyamide, ethylene-vinyl alcohol copolymer (EVOH), polyethylene, polypropylene, epoxy, and polystyrene.

The liner 10 includes a straight portion 11, dome-shaped portions 12, 13, and caps 14, 15. The straight portion 11 has a cylindrical shape. The dome-shaped portions 12, 13 are respectively provided on both ends of the straight portion 11. The dome-shaped portions 12, 13 are respectively disposed on both ends of the straight portion 11 in the direction of an axis AX of the liner 10. Each of the dome-shaped portions 12, 13 has a hemispherical shape. The cap 14 is provided at the apex of the dome-shaped portion 12. The cap 15 is provided at the apex of the dome-shaped portion 13. The caps 14, 15 are, for example, made of a metal, such as aluminum and stainless steel. The cap 14 has a communication hole 16 extending in the direction of the axis AX of the tank 100. The communication hole 16 functions as a flow channel when fluid is supplied to the tank 100 or when fluid is taken out from the tank 100. The cap 15 has no communication hole 16 and is sealed. The cap 15 is used at the time of, for example, centering during manufacture of the tank 100.

The reinforcement layer 20 is a layer that covers the outer surface of the liner 10. The reinforcement layer 20 reinforces the strength of the liner 10. The reinforcement layer 20 has a first layer 21 and a second layer 22 in a thickness direction. In other words, the reinforcement layer 20 has the first layer 21 as an inner layer and has the second layer 22 as an outer layer. Specifically, the reinforcement layer 20 has the first layer 21 formed to cover the outside of the straight portion 11 of the liner 10, and the second layer 22 formed to cover the outside of the first layer 21 and other exposed portions of the liner 10 except the caps 14, 15.

The first layer 21 has a cylindrical appearance. The first layer 21 is formed when a member called pipe (described later) is fitted to the liner 10. The pipe is formed by winding a first fiber reinforced resin around a mandrel that is a forming die and thermally curing the first fiber reinforced resin. The first fiber reinforced resin is made by impregnating a first resin with a first fiber. Examples of the first fiber include a carbon fiber, a glass fiber, and an aramid fiber. Particularly, from the viewpoint of strength, light weight, and the like, a carbon fiber is preferably used. Examples of the first resin include thermosetting resins, such as a phenolic resin, a melamine resin, a urea resin, a polyamide resin, and an epoxy resin.

The second layer 22 is formed by winding a second fiber reinforced resin around the liner 10 so as to cover the first layer 21 and thermally curing the second fiber reinforced resin. Specifically, the second layer 22 is formed by winding a second fiber reinforced resin around the outer surface of the first layer 21 and the outer surfaces of the dome-shaped portions 12, 13 and thermally curing the second fiber reinforced resin. The second fiber reinforced resin is made by impregnating a second resin with a second fiber. Examples of the second fiber, as well as the first fiber, include a carbon fiber, a glass fiber, and an aramid fiber. Examples of the second resin, as well as the first resin, include thermosetting resins, such as a phenolic resin, a melamine resin, a urea resin, a polyamide resin, and an epoxy resin.

A2. Manufacturing Method for Tank 100

Figure 2:
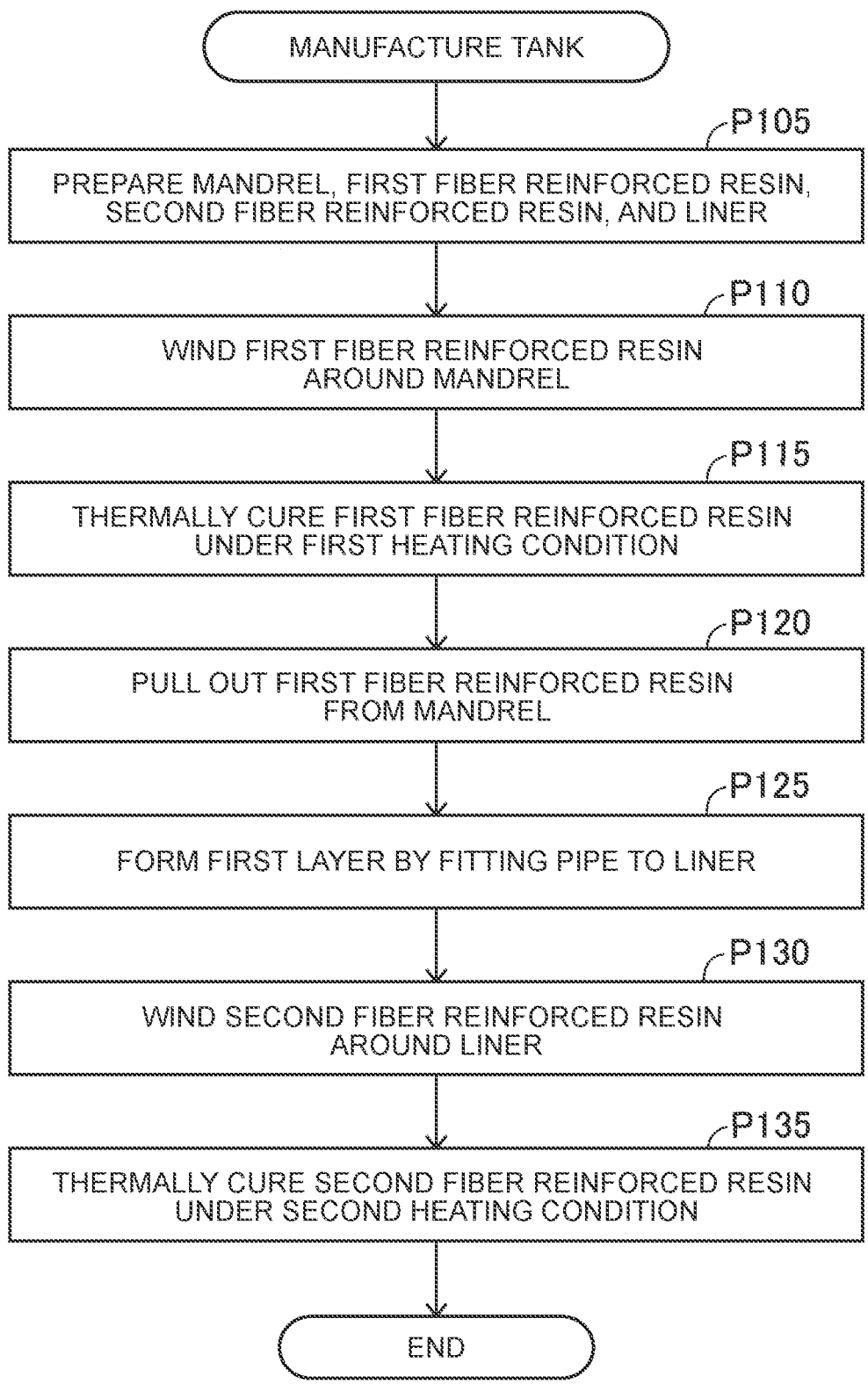
FIG. 2 is a process chart that shows a manufacturing method for a tank according to the first embodiment.

FIG. 2 is a process chart that shows a manufacturing method for the tank 100 according to the first embodiment. The tank 100 is manufactured in one operation in manufacturing the tank 100. Before the tank 100 is manufactured, the caps 14, 15 are attached to the liner 10 in advance.

A mandrel, a first fiber reinforced resin, a second fiber reinforced resin, and the liner 10 are prepared (operation P105). The mandrel is a forming die for a pipe. The mandrel has, for example, a circular columnar shape. In the present embodiment, the mandrel is made of aluminum.

A first fiber reinforced resin is wound around the mandrel (operation P110). A first fiber reinforced resin is wound by, for example, a filament winding method (FW method). Examples of a winding pattern of the first fiber reinforced resin include hoop winding, helical winding, and a combination of hoop winding and helical winding. A first fiber reinforced resin may be laminated by being wound multiple times.

The wound first fiber reinforced resin is heated and thermally cured under a first heating condition (operation P115). The first heating condition means temperature, pressure, time, and the like sufficient to cure the first fiber reinforced resin. In the first heating condition, the temperature may be constant or may change with time. The "temperature" in the first heating condition according to the present embodiment means a temperature in a heating furnace with which the first fiber reinforced resin is heated. The first heating condition depends on the base compound, curing agent, catalyst, and the like of the first resin contained in the first fiber reinforced resin. The first heating condition also depends on a desired strength of the pipe. The first heating condition includes, for example, heating at a setting temperature of the first resin. In the present embodiment, the "setting temperature" generally means a selected temperature in a temperature range identified as a "molding temperature" of a resin. The setting temperature is not limited to a temperature in a temperature range as described above. Alternatively, a temperature at which an advantageous effect is exhibited as a result of heating for a long time even at a temperature lower than the temperature range may be applied as the "setting temperature". The setting temperature is able to be obtained by, for example, differential scanning calorimetry (DSC).

Thermal curing in operation P115 is performed, for example, as follows. Initially, the mandrel around which the first fiber reinforced resin is wound is left in the heating furnace. Subsequently, the temperature in the heating furnace is gradually increased. An upper limit temperature in the heating furnace at this time is a temperature in the first heating condition. A temperature higher than estimated may be applied to the first fiber reinforced resin due to heat generation from a reaction. Therefore, a test piece of a fiber reinforced resin similar to the first fiber reinforced resin is prepared in advance, a test is performed for heating patterns of various temperature changes, and temperature data of a test piece is collected for each heating pattern. An appropriate procedure of temperature increase (temperature profile) may be determined by using the collected data, and the temperature may be increased as in the case of the procedure. At the time of heating, by increasing the temperature while monitoring the temperature of the first fiber reinforced resin, an increase in the temperature of the first fiber reinforced resin exceeding a set temperature to overshoot may be suppressed.

The thermally cured first fiber reinforced resin is pulled out from the mandrel (operation P120). Thus, a pipe having a cylindrical shape is formed.

The first layer 21 is formed by fitting the pipe to the liner 10 (operation P125). In the present embodiment, the one obtained by thermally curing the first fiber reinforced resin with the mandrel as a forming die is referred to as pipe, and the pipe fitted to the liner 10 is referred to as first layer 21. Therefore, the pipe and the first layer 21 are mutually replaceable words. When the inside diameter of the pipe is greater than the outside diameter of the straight portion 11 of the liner 10, the liner 10 and the pipe are further brought into close contact with each other by pressurizing the inside of the liner 10. On the other hand, when the inside diameter of the pipe is substantially the same as the outside diameter of the straight portion 11 of the liner 10 or less than the outside diameter of the straight portion 11, the liner 10 may be shrunk by cooling in advance and then the pipe may be fitted to the liner 10.

A second fiber reinforced resin is wound around the liner 10 (operation P130). A second fiber reinforced resin is wound by, for example, a filament winding method (FW method), as in the case of, for example, operation P110. Examples of a winding pattern of the second fiber reinforced resin include hoop winding, helical winding, and a combination of hoop winding and helical winding. A second fiber reinforced resin may be laminated by being wound multiple times.

The wound second fiber reinforced resin is heated and thermally cured under a second heating condition (operation P135). The second heating condition means temperature, pressure, time, and the like sufficient to cure the second fiber reinforced resin. The "temperature" in the second heating condition according to the present embodiment means a temperature in a heating furnace with which the second fiber reinforced resin is heated. The second heating condition depends on the base compound, curing agent, catalyst, and the like of the second resin contained in the second fiber reinforced resin. The second heating condition also depends on a desired strength of the second layer 22. The second heating condition includes, for example, heating at a setting temperature of the second resin.

In the present embodiment, an upper limit temperature in the second heating condition is a temperature at which a shear strength of the first resin contained is kept higher than a residual stress in the pipe. Such a temperature may be determined by, for example, a method described below. Initially, a pipe for measurement is prepared through the above-described operations P105, P110, P115, P120. Subsequently, a residual stress in the pipe is measured. The measurement is performed by, for example, a hole-drilling method (in compliant with ASTME 837-13). Subsequently, the shear strength of the first resin is measured. The measurement is performed by, for example, a shearing test compliant with JIS K7087. Measurement of a shear strength is performed at various temperatures. Subsequently, the setting temperature of the second fiber reinforced resin is measured. The measurement is performed by, for example, a DSC method or the like. The setting temperature of the second fiber reinforced resin is controlled by a base compound, a curing agent, a catalyst, and the like, contained in the second resin. From the thus measured residual stress in the pipe, the shear strength of the first resin, and the setting temperature of the second fiber reinforced resin, a temperature for heating the second fiber reinforced resin is determined such that the shear strength of the first resin is kept higher than the residual stress in the pipe.

Thermal curing in operation P135 is performed, for example, as follows. Initially, the liner 10 around which the second fiber reinforced resin is wound is left standing in the heating furnace. Subsequently, the temperature in the heating furnace is gradually increased. An upper limit temperature in the heating furnace at this time is a temperature at which the shear strength of the first resin is kept higher than a residual stress in the pipe. As described in thermal curing of the first fiber reinforced resin in operation P115, a test may also be performed in advance on the second fiber reinforced resin for various temperature change patterns, and a procedure of increasing the temperature (temperature profile) may be determined based on the test results. The temperature may be increased while the temperature of the second fiber reinforced resin is being monitored. By heating in this way, the second fiber reinforced resin is thermally cured. When the second layer 22 is formed by thermally curing the second fiber reinforced resin, the tank 100 shown in FIG. 1 is completed.

Figure 3:
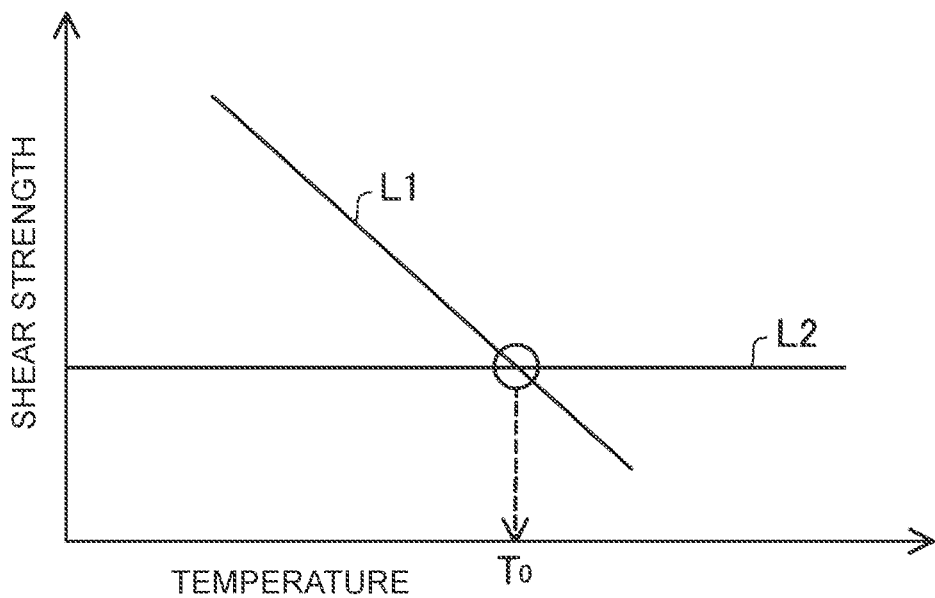
FIG. 3 is a graph that shows the relationship between the shear strength (ordinate axis) and temperature (abscissa axis) of thermosetting resin, and residual stress in a pipe.

The reason why the upper limit temperature in the second heating condition is set to a temperature at which the shear strength of the first resin is kept higher than the residual stress in the pipe as described above will be described as follows. FIG. 3 is a graph that shows the relationship between the shear strength (ordinate axis) and temperature (abscissa axis) of a thermosetting resin, and residual stress in the pipe. The continuous line L1 represents the relationship between the shear strength and temperature of the first resin. The continuous line L2 represents residual stress in the pipe. The temperature T0 is a temperature at which the shear strength of the first resin is equal to the residual stress in the pipe. Therefore, when the temperature is higher than the temperature T0, the shear strength of the first resin is lower than the residual stress in the pipe, so breakage of the pipe can occur.

When the pipe is formed, a first fiber reinforced resin is wound around the mandrel while being applied with a tension by the FW method. When the first fiber reinforced resin is thermally cured, the mandrel expands due to heat. At this time, not only the tension caused by the FW method but also a force in a pulling direction due to thermal expansion of the mandrel is applied to the pipe. Curing advances in a state where these two forces are applied, so a residual stress remains in the thermally cured pipe. When the second fiber reinforced resin is thermally cured, heat is applied to the pipe again, so the first resin in the pipe softens with an increase in temperature, and the shear strength decreases. When the temperature exceeds the temperature TO and the shear strength of the first resin is lower than the residual stress in the pipe, the pipe can break. For this reason, as in the case of the present embodiment, the upper limit temperature in the second heating condition is set to a temperature at which the shear strength of the first resin is kept higher than the residual stress in the pipe (for example, a temperature lower than the temperature TO). Thus, when the second layer 22 is formed by thermal curing, it is possible to reduce a situation in which the shear strength of the first resin is lower than the residual stress in the pipe. Hence, when the second layer 22 is formed by thermal curing, breakage of the pipe is suppressed.

With the manufacturing method for the tank 100 according to the first embodiment described above, since the second heating condition contains a temperature at which the shear strength of the first resin is kept higher than the residual stress in the pipe as an upper limit temperature, breakage of the pipe is suppressed when the second layer 22 is formed by thermal curing.

B. Second Embodiment

A manufacturing method for the tank 100 according to a second embodiment differs from the manufacturing method for the tank 100 according to the first embodiment in that the manufacturing method includes preparing a mandrel made of a material having the same coefficient of linear expansion as the first fiber reinforced resin as the mandrel, that is, a forming die for the pipe. The operation can be performed in the operation P105. The remaining configuration of the manufacturing method for the tank 100 according to the second embodiment is the same as the manufacturing method for the tank 100 according to the first embodiment, so the description thereof is omitted. In the specification, the "same coefficient of linear expansion" is not limited to the case where the coefficient of linear expansion is completely the same and has a wide concept including the case where the coefficient of linear expansion is different within the range of about ±10%.

Figure 4:
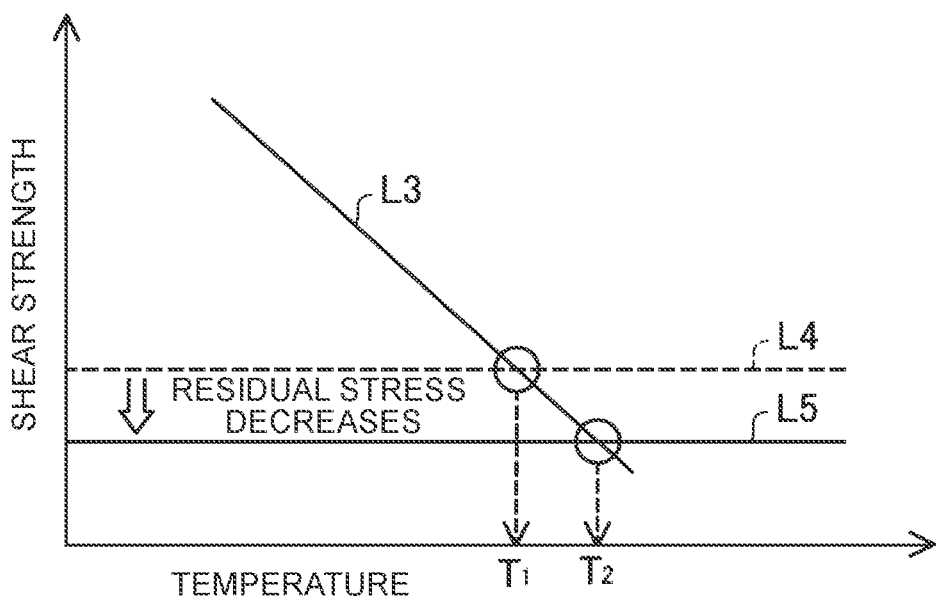
FIG. 4 is a graph that shows the relationship between the shear strength (ordinate axis) and temperature (abscissa axis) of a thermosetting resin, and residual stress in the pipe.

FIG. 4 is a graph that shows the relationship between the shear strength (ordinate axis) and temperature (abscissa axis) of a thermosetting resin, and residual stress in the pipe. The continuous line L3 represents the relationship between the shear strength and temperature of the first resin. The dashed line L4 represents the residual stress in the pipe when the pipe is formed with the mandrel made of a material (for example, aluminum) having a coefficient of linear expansion different from that of the pipe as a forming die. The continuous line L5 represents the residual stress in the pipe when the pipe is formed with the mandrel made of a material (for example, first fiber reinforced resin) having the same coefficient of linear expansion as the first fiber reinforced resin as a forming die. The temperature T1 is a temperature at which the shear strength of the first resin is equal to the residual stress in the pipe when the pipe is formed with the mandrel made of a material different from the material of the pipe as a forming die. Therefore, when the temperature is higher than the temperature T1, the shear strength of the first resin is lower than the residual stress in the pipe, so breakage of the pipe can occur.

When the mandrel made of a material having the same coefficient of linear expansion as the first fiber reinforced resin is used, the mandrel and the pipe thermally expand at the same rate when the pipe is formed by thermal curing. For this reason, the residual stress in the pipe formed reduces in comparison with the case where the mandrel made of a material having a coefficient of linear expansion different from the coefficient of linear expansion of the pipe is used. Therefore, a temperature at which the shear strength of the first resin is equal to the residual stress in the pipe is allowed to be set to the temperature T2 that is higher than the temperature T1. Thus, even at a temperature higher than the temperature T1, the shear strength of the first resin is kept higher than the residual stress in the pipe.

With the manufacturing method for the tank 100 according to the second embodiment described above, the residual stress in the pipe is reduced in comparison with the case where the pipe is formed with the mandrel having a coefficient of linear expansion different from the coefficient of linear expansion of the first fiber reinforced resin. Therefore, the shear strength of the first resin is kept higher than the residual stress in the pipe when the second layer 22 is formed by thermal curing, so breakage of the pipe due to the residual stress is suppressed.

C. Third Embodiment

A manufacturing method for the tank 100 according to a third embodiment differs from the manufacturing method for the tank 100 according to the first embodiment or the manufacturing method for the tank 100 according to the second embodiment in that the second heating condition includes a condition in which the second fiber reinforced resin wound around the liner 10 is heated at the setting temperature of the second resin. The manufacturing method for the tank 100 according to the third embodiment differs from the manufacturing method for the tank 100 according to the first embodiment or the manufacturing method for the tank 100 according to the second embodiment in that the operation P105 includes an operation of preparing the first resin and the second resin such that the shear strength of the first resin contained in the first layer 21 is higher than the residual stress in the pipe at the setting temperature of the second resin. The remaining configuration of the manufacturing method for the tank 100 according to the third embodiment is the same as the manufacturing method for the tank 100 according to the first embodiment, so the description thereof is omitted. The manufacturing method for the tank 100 according to the third embodiment may be combined with the manufacturing method for the tank 100, described in the second embodiment.

Figure 5:
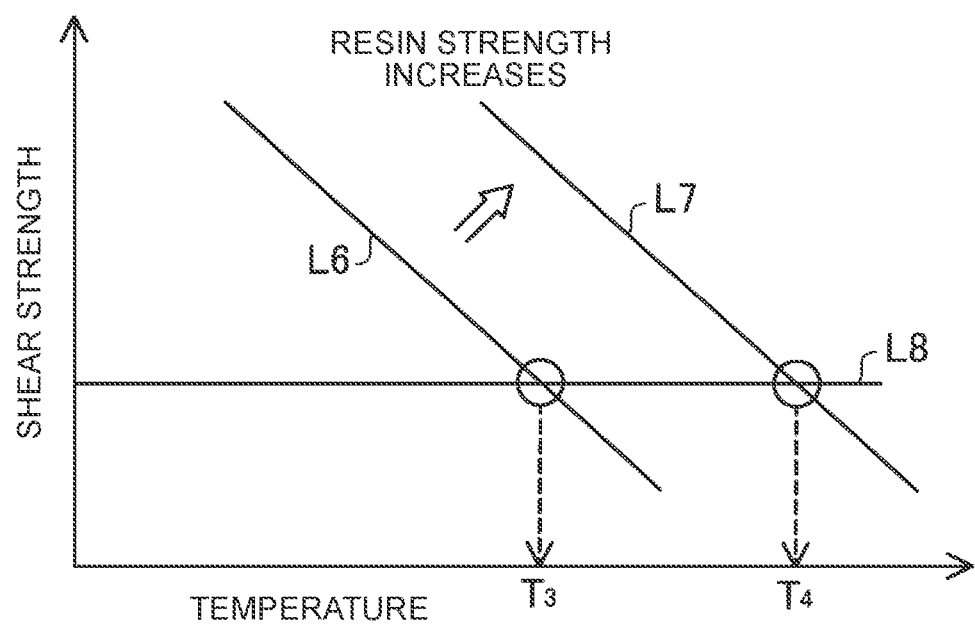
FIG. 5 is a graph that shows the relationship between the shear strength (ordinate axis) and temperature (abscissa axis) of thermosetting resins, and residual stress in the pipe.

FIG. 5 is a graph that shows the relationship between the shear strength (ordinate axis) and temperature (abscissa axis) of two-type thermosetting resins, and residual stress in the pipe. L6 represents the relationship between the shear strength and temperature of a thermosetting resin. L7 represents the relationship between the shear strength and temperature of a high heat-resistant thermosetting resin. L8 represents residual stress in the pipe. The temperature T3 is a temperature at which the shear strength of the thermosetting resin is equal to the residual stress in the pipe. The properties of the cured resin can be controlled by a base compound, a curing agent, a catalyst, and the like contained in the resin. When, for example, the pipe is formed by using the high heat-resistant thermosetting resin capable of relatively keeping a high shear strength at a high temperature, a temperature at which the shear strength of the resin is equal to the residual stress in the pipe is able to be set to the temperature T4 higher than the temperature T3. Therefore, when the high heat-resistant thermosetting resin as described above is used as the first resin, the shear strength of the first resin is kept higher than the residual stress in the pipe even at a temperature higher than the temperature T3.

As described above, the setting temperature of the resin can also be controlled by a base compound, a curing agent, a catalyst, and the like contained in the resin. Therefore, by preparing the second resin having a relatively low setting temperature, heat to be applied to the pipe is reduced when the second layer 22 is formed.

With the manufacturing method for the tank 100 according to the third embodiment described above, the shear strength of the first resin is kept higher than the residual stress in the pipe at the setting temperature of the second resin. Therefore, when the second layer 22 is formed by thermal curing, breakage of the pipe due to the residual stress is suppressed.

In manufacturing the tank 100, to reduce breakage of the pipe when the second layer 22 is formed, the second layer 22 can be formed at a temperature slightly lower than the setting temperature of the second resin. However, since heating is performed at a temperature slightly lower than the setting temperature, longer time is required to cure the second resin in comparison with the case where heating is performed at a temperature higher than or equal to the setting temperature. With the manufacturing method for the tank 100 according to the third embodiment, the shear strength of the first resin is kept higher than the residual stress in the pipe at the setting temperature of the second resin, so heating is performed at the setting temperature of the second resin when the second layer 22 is formed. Thus, in comparison with the case where heating is performed at a temperature slightly lower than the setting temperature of the second resin to reduce breakage of the pipe, manufacturing time of the tank 100 is shortened.

D. Other Embodiments (D1) In the first embodiment, the mandrel made of a material having a coefficient of linear expansion less than the coefficient of linear expansion of aluminum may be prepared in the operation P105. In the first embodiment, the mandrel is made of aluminum. Instead of aluminum, the mandrel may be made of a selected material having a coefficient of linear expansion less than the coefficient of linear expansion of aluminum. By forming the mandrel of such a material, the thermal expansion of the mandrel when the pipe is formed is suppressed. Examples of such a material include SUS, invar, steel, and Nobinite (registered trademark). With such a method, the thermal expansion of the mandrel during formation of the pipe reduces, so the residual stress in the formed pipe also reduces. Therefore, when the second layer 22 is formed by thermal curing, breakage of the pipe is suppressed.

(D2) In each of the embodiments, the maximum heating temperature in the second heating condition may be lower than the maximum heating temperature in the first heating condition. With the above method, not only when the heating temperature is constant but also when the heating temperature changes with time, the maximum temperature to be applied to the pipe when the second layer 22 is formed is lower than the maximum temperature applied when the pipe is formed. Therefore, when the second layer 22 is formed, a decrease in the shear strength of the first resin is suppressed, and breakage of the pipe is suppressed.

(D3) In the tank 100 according to the first embodiment, the setting temperature of the first resin contained in the first layer 21 may be higher than the setting temperature of the second resin contained in the second layer 22. With the thus configured tank 100, the setting temperature of the first resin is higher than the setting temperature of the second resin, so, in comparison with the case where the setting temperature of the first resin is lower than the setting temperature of the second resin, it is possible to reduce a situation in which the shear strength of the first resin is lower than the residual stress in the pipe when the second layer 22 is formed by thermal curing. Therefore, breakage of the pipe when the second layer 22 is formed is suppressed.

(D4) In each of the embodiments, the first layer 21 is formed so as to cover the outer side of the straight portion 11 of the liner 10; however, the disclosure is not limited thereto. For example, the first layer 21 may be formed so as to cover an outer peripheral portion of the liner 10 except the caps 14, 15.

The disclosure is not limited to the above-described embodiments and may be implemented in various modes without departing from the purport of the disclosure. For example, the technical characteristics in the embodiments, corresponding to the technical characteristics in the aspects described in SUMMARY, may be replaced or combined as needed to solve part or all of the above-described inconvenience or to achieve part or all of the above-described advantageous effects. The technical characteristics not described as being indispensable in the specification may be deleted as needed.

What is claimed is:

1. A manufacturing method for a tank, the tank including a liner and a reinforcement layer, the reinforcement layer having a first layer made up of a pipe fitted to an outer surface of the liner and a second layer covering the pipe, the manufacturing method comprising:
    forming the pipe by winding a first fiber reinforced resin around a mandrel, and thermally curing the wound first fiber reinforced resin under a first heating condition, the first fiber reinforced resin containing a first fiber and a first resin;
    forming the first layer by fitting the pipe to the liner; and
    forming the second layer by winding a second fiber reinforced resin around the liner so as to cover the first layer, and thermally curing the wound second fiber reinforced resin under a second heating condition, the second fiber reinforced resin containing a second fiber and a second resin, wherein
    the second heating condition includes a condition that the second fiber reinforced resin is cured at a temperature at which a shear strength of the first resin is kept higher than a residual stress in the pipe, and
    a maximum heating temperature of the second heating condition is lower than a maximum heating temperature of the first heating condition.

2. The manufacturing method according to claim 1, wherein the mandrel is made of a material having the same coefficient of linear expansion as the first fiber reinforced resin.

3. The manufacturing method according to claim 1, wherein:
    the second heating condition includes a condition in which the wound second fiber reinforced resin is heated at a setting temperature of the second resin, the setting temperature being a temperature selected in a temperature range of curing temperature of the second resin;

the manufacturing method further comprising preparing the first resin and the second resin such that, at the setting temperature of the second resin, the shear strength of the first resin contained in the first layer is higher than the residual stress in the pipe.

* * * * *